(12) United States Patent
Graham et al.

(10) Patent No.: US 11,465,590 B2
(45) Date of Patent: Oct. 11, 2022

(54) WINDSHIELD WIPER BLADE ASSEMBLY

(71) Applicant: Pylon Manufacturing Corporation, Deerfield Beach, FL (US)

(72) Inventors: Matthew Graham, West Plam Beach, FL (US); Vambi Raymundo Tolentino, Coconut Creek, FL (US); Will Young, Deerfield Beach, FL (US)

(*) Notice: Subject to any disclaimer, the term of this patent is extended or adjusted under 35 U.S.C. 154(b) by 376 days.

(21) Appl. No.: 16/049,689

(22) Filed: Jul. 30, 2018

(65) Prior Publication Data
US 2019/0031150 A1 Jan. 31, 2019

Related U.S. Application Data

(60) Provisional application No. 62/538,368, filed on Jul. 28, 2017.

(51) Int. Cl.
*B60S 1/38* (2006.01)

(52) U.S. Cl.
CPC ..... *B60S 1/3801* (2013.01); *B60S 2001/3812* (2013.01); *B60S 2001/3815* (2013.01); *B60S 2001/3843* (2013.01)

(58) Field of Classification Search
CPC .... B60S 1/0408; B60S 1/3806; B60S 1/3801; B60S 2001/3813; B60S 2001/3815; B60S 2001/3812; B60S 2001/3843
USPC ............ 15/250.44, 250.43, 250.46, 250.201
See application file for complete search history.

(56) References Cited

U.S. PATENT DOCUMENTS

| 4,137,598 | A | * | 2/1979 | Sharp | B60S 1/3801 15/250.46 |
|---|---|---|---|---|---|
| 4,342,126 | A | * | 8/1982 | Neefeldt | B60S 1/3801 15/246 |
| 4,360,942 | A | * | 11/1982 | Dal Palu' | B60S 1/3806 15/250.46 |
| 4,422,207 | A | * | 12/1983 | Maiocco | B60S 1/3801 15/250.32 |
| 4,794,664 | A | * | 1/1989 | Arai | B60S 1/3801 15/250.32 |

(Continued)

FOREIGN PATENT DOCUMENTS

| CA | 2789431 C | 8/2011 |
|---|---|---|
| CA | 2802812 A1 | 1/2012 |

(Continued)

OTHER PUBLICATIONS

Machine translation of description portion of German publication 19938661, published Mar. 2001. (Year: 2001).*

*Primary Examiner* — Gary K. Graham
(74) *Attorney, Agent, or Firm* — The Brickell IP Group, PLLC; Javier Sobrado; A. Robert Weaver (57) ABSTRACT

A windshield wiper assembly may include a wiper strip, and a force distribution structure securing the wiper strip comprising. The force distribution structure may include a primary frame structure, and a secondary frame structure. The primary frame structure may include a central base portion, a leg extending from the central base portion to its end, and a first boss connecting structure. The secondary frame structure may include a first complementary connecting structure such that the first boss connecting structure and the first complementary connecting structure pivotally engage one another.

19 Claims, 6 Drawing Sheets

(56) References Cited

U.S. PATENT DOCUMENTS

| | | | | |
|---|---|---|---|---|
| 4,953,251 A | * | 9/1990 | Chow | B60S 1/3801 |
| | | | | 15/250.46 |
| 7,627,925 B2 | * | 12/2009 | Roekens | B60S 1/3806 |
| | | | | 15/250.201 |
| 8,381,349 B2 | | 2/2013 | Ku | |
| 8,713,747 B2 | | 5/2014 | Coughlin | |
| 9,783,165 B2 | | 10/2017 | Houssat et al. | |
| 9,925,957 B2 | | 3/2018 | Shen | |
| 9,969,360 B2 | | 5/2018 | Benner et al. | |
| 9,969,361 B2 | | 5/2018 | Fink et al. | |
| 2005/0166349 A1 | * | 8/2005 | Nakano | B60S 1/3806 |
| | | | | 15/250.201 |
| 2018/0079390 A1 | | 3/2018 | Tolentino et al. | |
| 2018/0086312 A1 | | 3/2018 | Houssat et al. | |
| 2018/0086313 A1 | | 3/2018 | Houssat et al. | |
| 2018/0086314 A1 | | 3/2018 | Houssat et al. | |
| 2018/0105144 A1 | | 4/2018 | Yee et al. | |
| 2018/0126956 A1 | | 5/2018 | Lee et al. | |
| 2018/0126957 A1 | | 5/2018 | Lee et al. | |

FOREIGN PATENT DOCUMENTS

| | | | |
|---|---|---|---|
| CA | 2865295 C | | 8/2013 |
| CN | 101087709 A | | 12/2007 |
| CN | 101863265 B | | 10/2010 |
| CN | 102001327 A | | 4/2011 |
| CN | 102164786 A | | 8/2011 |
| CN | 201998951 U | | 10/2011 |
| CN | 202193060 U | | 4/2012 |
| CN | 102653269 A | | 9/2012 |
| CN | 102917923 A | | 2/2013 |
| CN | 102958764 A | | 3/2013 |
| CN | 202863398 U | | 4/2013 |
| CN | 104114418 A | | 10/2014 |
| CN | 104114420 A | | 10/2014 |
| CN | 104125899 A | | 10/2014 |
| CN | 104144828 A | | 11/2014 |
| CN | 104149745 A | | 11/2014 |
| CN | 104149746 A | | 11/2014 |
| CN | 104149747 A | | 11/2014 |
| CN | 104228770 A | | 12/2014 |
| CN | 104512379 A | | 4/2015 |
| CN | 105283358 A | | 1/2016 |
| CN | 105431336 A | | 3/2016 |
| CN | 106394509 A | | 2/2017 |
| DE | 19938661 | * | 3/2001 |
| EP | 2683581 B1 | | 8/2016 |
| EP | 2808207 B1 | | 9/2016 |
| EP | 3072757 B1 | | 9/2016 |
| EP | 3142904 B1 | | 3/2017 |
| EP | 3178710 A1 | | 6/2017 |
| EP | 2660109 B1 | | 9/2017 |
| EP | 3083344 B1 | | 4/2018 |
| EP | 3164304 B1 | | 6/2018 |
| EP | 2996911 B1 | | 8/2018 |
| EP | 3165416 B1 | | 8/2018 |
| FR | 2487759 | * | 2/1982 |
| FR | 2502084 | * | 9/1982 |
| GB | 2159043 | * | 11/1985 |
| HK | 1110560 A1 | | 5/2010 |
| IN | 5021 B | | 1/2007 |
| JP | 2005524567 A | | 8/2005 |
| JP | 2010018273 U | | 1/2010 |
| WO | 2014040050 A1 | | 3/2014 |
| WO | 2017063687 A1 | | 4/2017 |
| WO | 2017190762 A1 | | 11/2017 |
| WO | 2017201458 A1 | | 11/2017 |
| WO | 2017201464 A1 | | 11/2017 |
| WO | 2017201485 A1 | | 11/2017 |

* cited by examiner

WINDSHIELD WIPER BLADE ASSEMBLY

CROSS REFERENCE TO RELATED APPLICATIONS

This application claims priority to U.S. Provisional Application No. 62/538,368 Filed Jul. 28, 2017, the entire contents of which is hereby incorporated by reference.

FIELD OF THE DISCLOSURE

This disclosure relates generally to wiper blade assemblies for vehicles.

BACKGROUND

In an effort to improve upon the traditional, bracketed wiper blade, the beam blade (or flat blade) was developed, keeping a lower profile and generally providing a more uniform distribution than most bracketed wiper blades. U.S. Pat. No. 8,397,341 to Edhe discloses an example beam blade known in the prior art. However, beam blades do not have the lateral stability of bracketed blades, and can have problems with wrapping (i.e. keeping contact between the outer edges of the wiper blade and windshield) when their curvature is too sharp for the windshield. Accordingly, beam blades may be serve well for original equipment (i.e. the wiper blades installed by manufacturers on cars that are designed specifically for that car), but can experience problems on certain vehicles if designed as aftermarket wiper blades (i.e. replacement blades designed to be used on a variety of different windshields where the manufacturer does not know what vehicle the blade will be used on).

The first generation of hybrid wiper blades developed improved on beam blade performance in these circumstances. These blades combine the use of brackets with a beam-like characteristics without creating problems with banding. One such improvement of this hybrid wiper blade, using a combination of traditional brackets and either beams or flat brackets, was previously disclosed in U.S. Ser. No. 13/776,376, the entire contents of which are hereby incorporated by reference. The instance disclosure provides further improvements to hybrid wiper blades as well as universal connectors and connector assemblies.

SUMMARY OF THE DISCLOSURE

The following presents a simplified summary of the disclosure in order to provide a basic understanding of some aspects of the various embodiments disclosed. This summary is not an extensive overview of all embodiments. It is intended to neither identify key or critical elements of the embodiments nor delineate the scope of the disclosure. Its sole purpose is to present some concepts of the embodiments in a simplified form as a prelude to the more detailed description that is presented later.

In certain embodiments, a windshield wiper assembly may include a wiper strip, and a force distribution structure securing the wiper strip comprising. The force distribution structure may include a primary frame structure, and a secondary frame structure. The primary frame structure may include a central base portion, a leg extending from the central base portion to its end, and a first boss connecting structure. The secondary frame structure may include a first complementary connecting structure such that the first boss connecting structure and the first complementary connecting structure pivotally engage one another.

In certain embodiments, a windshield wiper assembly may include, a wiper strip and a force distribution structure securing the wiper strip. The force distribution structure may include a primary frame structure, first and secondary frame structures and a first and second pair of tertiary frames. The primary frame structure may include a central base portion, a first and second leg, where each leg may include a primary boss connecting structure. The first and second secondary frame structures may each include a primary complementary connecting structure, and a pair of legs, where each leg may include a secondary boss connecting structure. The first and second pair of tertiary frames may each include an inner tertiary frame and an outer tertiary frame. Each of the tertiary frames may include a secondary complementary connecting structure, and a pair of legs extending from the secondary complementary connecting structure to their respective ends, and a pair of claws at each respective end of the tertiary frame structures that engage the wiper strip. The primary boss connecting structure and the primary complementary connecting structure may pivotally engage one another. The secondary boss connecting structures of each of the secondary frames may pivotally engage a respective secondary complementary connecting structure of the tertiary frames.

In some embodiments, a wiper blade assembly may include a wiper strip; a force distribution structure securing the wiper strip. The force distribution structure may include a primary frame structure, which may have a central base portion, and a first and second legs, each leg extending from the central base portion to a respective end. Each leg of the primary frame structure may include a pair of opposed bosses proximate the respective ends. Each of the opposed bosses may be shaped as truncated cylinders having a horizontal orientation. The force distribution structure may further include a first and second secondary frame structures. Each secondary frame structure may include a primary pair of pockets that open outwardly, each having a receiving channel oriented vertically. Each secondary frame structures may further include a pair of legs extending from the primary pair of pockets to a respective end. Each of the respective ends of the legs of the secondary frame structures may include a secondary pair of pockets that open outwardly. The force distribution structure may further include a first and second pair of tertiary frames. Each of the tertiary frames may include a secondary pair of opposed bosses, a pair of legs extending from the secondary pair of opposed bosses to their respective ends, and a pair of claws at each respective end of the tertiary frame structures that engage the wiper strip. The opposed bosses of the primary frame structure may be pivotally disposed in the respective primary pair of pockets of the first and secondary frame structures. The secondary pair of opposed bosses of each of the tertiary frames may be pivotally disposed in the respective secondary pair of pockets of the first and second frame structures.

BRIEF DESCRIPTION OF THE DRAWINGS

The following description and the annexed drawings set forth certain illustrative aspects of various embodiments of the disclosure. These aspects are indicative of but a few of the various way in which the principles disclosed may be employed. Advantages and features of the disclosed embodiments will become apparent from the following detailed description of the disclosure when considered in conjunction with the drawings.

DETAILED DESCRIPTION

The foregoing detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by appended claims and their equivalents.

In the description that follows, like numerals or reference designator will be used to refer to like parts or elements throughout. In this document, the terms "a" or "an" are used as is common in patent documents to include one or more than one. In this document, the term "or" is used to refer to a nonexclusive or, unless otherwise indicated.

In certain embodiments, a windshield wiper assembly may include a wiper strip, and a force distribution structure securing the wiper strip comprising. The force distribution structure may include a primary frame structure, and a secondary frame structure. The primary frame structure may include a central base portion, a leg extending from the central base portion to its end, and a first boss connecting structure. The secondary frame structure may include a first complementary connecting structure such that the first boss connecting structure and the first complementary connecting structure pivotally engage one another.

In certain embodiments, the first boss connecting structure may be a boss structure, and the first complementary connecting structure may be a pocket structure. In certain embodiments, the boss structure may be a pair of opposed bosses. In certain such embodiments the opposed bosses may extend inwardly from opposed side walls of the legs of the primary frame structure. In certain embodiments, the boss structure may be a rivet extending between the legs of the primary frame structure. In certain embodiments, the opposed bosses may be truncated cylinders. In certain such embodiments the opposed bosses may be oriented horizontally. In certain embodiments, the pocket structure may be a pair of pockets that open outwardly. In certain embodiments, each pocket may be provided with a receiving channel to facilitate insertion of the boss structure into the pocket structure. In certain embodiments, the first boss connecting structure may be a pocket structure, and the first complementary connecting structure may be a boss structure.

In certain embodiments, the secondary frame structure may be "T" shaped. In certain embodiments the force distribution structure may further include a tertiary frame structure. The tertiary frame structure may include a second complementary connecting structure, and the secondary frame structure may further include a second boss connecting structure. In certain embodiments, the second boss connecting structure may be a pocket structure, and the second complementary connecting structure may be a boss structure. In certain embodiments, the second complementary connecting structure is a second pair of opposed bosses extending inwardly, and the second boss connecting structure may be a pair of pockets that open outwardly. In certain embodiments, the second pair of opposed bosses may be truncated cylinders that may be oriented vertically.

In certain embodiments, the windshield wiper assembly may further include a cover section comprising a top portion, a pair of side walls, an inner end and an outer end. In certain embodiments, the cover section further may include a retention tab proximate the inner end, and the primary frame may further include a notch proximate the central base portion, such that the retention tab can engage the notch to secure the cover to the primary frame structure. In certain embodiments, the cover section may further include a lip proximate the inner end, such that the lip can wrap around a bottom of the primary frame structure to further secure the cover to the primary frame structure. In certain embodiments the cover section further may include securing holes proximate the central base portion, and the primary frame structure may further include securing tabs that may engage the securing holes in the cover section. In certain embodiments, the cover section may further include a locking protrusion extending downward from a top portion. The locking protrusion may engage an interior recess of the force distribution structure to help secure the cover to the wiper blade assembly. In certain embodiments, the cover section may further include an end recess capable of receiving the end of the force distribution structure.

In certain embodiments, a windshield wiper assembly may include, a wiper strip and a force distribution structure securing the wiper strip. The force distribution structure may include a primary frame structure, first and secondary frame structures and a first and second pair of tertiary frames. The primary frame structure may include a central base portion, a first and second leg, where each leg may include a primary boss connecting structure. The first and second secondary frame structures may each include a primary complementary connecting structure, and a pair of legs, where each leg may include a secondary boss connecting structure. The first and second pair of tertiary frames may each include an inner tertiary frame and an outer tertiary frame. Each of the tertiary frames may include a secondary complementary connecting structure, and a pair of legs extending from the secondary complementary connecting structure to their respective ends, and a pair of claws at each respective end of the tertiary frame structures that engage the wiper strip. The primary boss connecting structure and the primary complementary connecting structure may pivotally engage one another. The secondary boss connecting structures of each of the secondary frames may pivotally engage a respective secondary complementary connecting structure of the tertiary frames.

In some embodiments, a wiper blade assembly may include a wiper strip; a force distribution structure securing the wiper strip. The force distribution structure may include a primary frame structure, which may have a central base portion, and a first and second legs, each leg extending from the central base portion to a respective end. Each leg of the primary frame structure may include a pair of opposed bosses proximate the respective ends. Each of the opposed bosses may be shaped as truncated cylinders having a horizontal orientation. The force distribution structure may further include a first and second secondary frame structures. Each secondary frame structure may include a primary pair of pockets that open outwardly, each having a receiving channel oriented vertically. Each secondary frame structures may further include a pair of legs extending from the primary pair of pockets to a respective end. Each of the respective ends of the legs of the secondary frame structures may include a secondary pair of pockets that open outwardly. The force distribution structure may further include a first and second pair of tertiary frames. Each of the tertiary frames may include a secondary pair of opposed bosses, a pair of legs extending from the secondary pair of opposed bosses to their respective ends, and a pair of claws at each respective end of the tertiary frame structures that engage the wiper strip. The opposed bosses of the primary frame structure may be pivotally disposed in the respective primary pair of pockets of the first and secondary frame structures. The secondary pair of opposed bosses of each of the tertiary frames may be pivotally disposed in the respective secondary pair of pockets of the first and second frame structures.

In certain embodiments, the structure of a windshield wiper assembly may have primary structure, secondary structure, and tertiary frame structures. One embodiment may include a primary frame structure, two secondary frame structures, and four tertiary frame structures. The primary frame structure may have two opposing longitudinal ends, a top side, and a bottom side. Each longitudinal end may have a pair of opposing connecting bosses. The connecting bosses may be circular in nature with a top and bottom circular segment removed, creating two equal, opposing flat edges on the connecting boss. The primary frame structure may also feature a central base portion having a central mounting pin, located between the longitudinal ends. Proximate to the central base portion may exist a top notch on the top end of the primary frame structure. Securing tabs may be featured on the bottom end of the primary frame structure proximate the central base portion.

In certain embodiments, the secondary frame structures may have two longitudinal ends on opposing sides, a top side, and a bottom side. The secondary structure may also have a central pair of opposing pockets situated between the two longitudinal ends and a pair of opposing pockets at each longitudinal end. Each pocket of the secondary frame structure may be a cylindrical pocket with a partial opening along an edge of the pocket. The partial openings of the central pockets may be positioned proximate to the top end of the secondary structure and the partial opening of the longitudinal pockets may be positioned toward their respective ends away from the central pockets. The connecting bosses of the primary frame structure may be defined by a diameter greater than partial openings of central pockets of the secondary structure and two chords of equal length, the distance between the chords being less than the partial openings of the central pockets of the secondary structure.

In certain embodiments, the tertiary frame structures may include two longitudinal ends on opposing sides, a top side, and a bottom side. Located between the two longitudinal ends may be a pair of connecting bosses. Each connecting boss of the tertiary frame structure may be circular in nature with left and right circular segment removed, creating two equal, opposing flat edges on the boss. The connecting boss may be defined by a diameter greater than the partial openings of the longitudinal pockets of the secondary structure and two chords of equal length, the distance between the chords being less than the partial openings of the longitudinal pockets of the secondary structure. The tertiary structure may also include opposing interior recesses proximate the connecting bosses and opposite the secondary frame structure in an engaged position. The interior recess may also be an opening.

In certain embodiments, one secondary frame structure may be connected to each of the longitudinal ends of the primary frame structure by situating the connecting bosses of the primary frame structure within the central pockets of the secondary frame structures. One tertiary frame structure may be connected to each longitudinal end of the secondary frame structure by situating the connecting bosses of the tertiary frame structures within the longitudinal pockets of the secondary frame structure. The connecting bosses may be engaged with a pocket of the secondary frame structure by aligning the flat edges of the connecting bosses with the partial openings of the pockets and inserting the bosses within the pockets. Upon rotation of one of the frame structures, the connecting boss is secured within the pocket.

In certain embodiments, the windshield wiper assembly may comprise a wiper blade cover. The wiper blade cover may obscure most of the primary, secondary, and tertiary frame structures. The wiper blade cover may be a two-piece soft cover design. The wiper blade cover may include various features for attaching the cover to the frame structures. The wiper blade cover may comprise a retention tab for engaging a notch located atop the primary frame structure, two recesses for engaging with tabs located at the bottom of the primary frame structure. The wiper blade cover may also have a lip to partially wrap around the bottom of the primary frame structure to further secure the cover. Recesses may be provided at the interior of the wiper blade cover to provide clearance for the frame structures. The wiper blade cover may also feature a locking protrusion extending downward from a top surface for engaging with the interior recesses of the tertiary structure.

Figure 1:
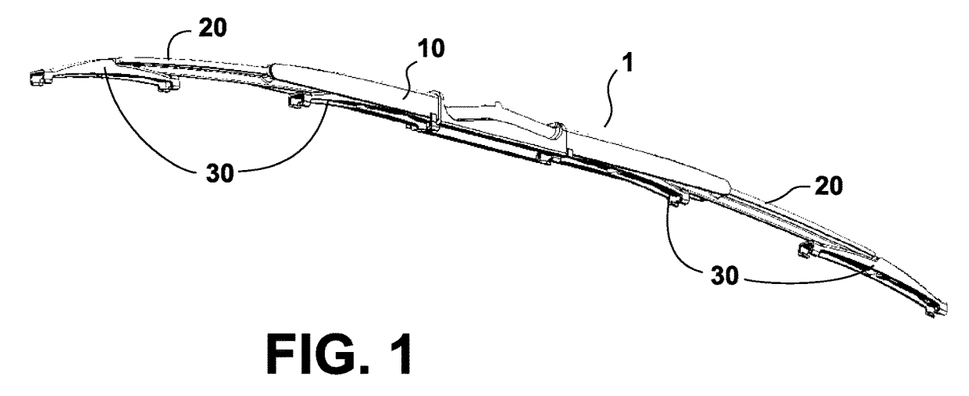
FIG. 1 is a perspective view of an embodiment of a force distribution structure of a wiper blade assembly in accordance with the disclosed concepts.
Figure 8:
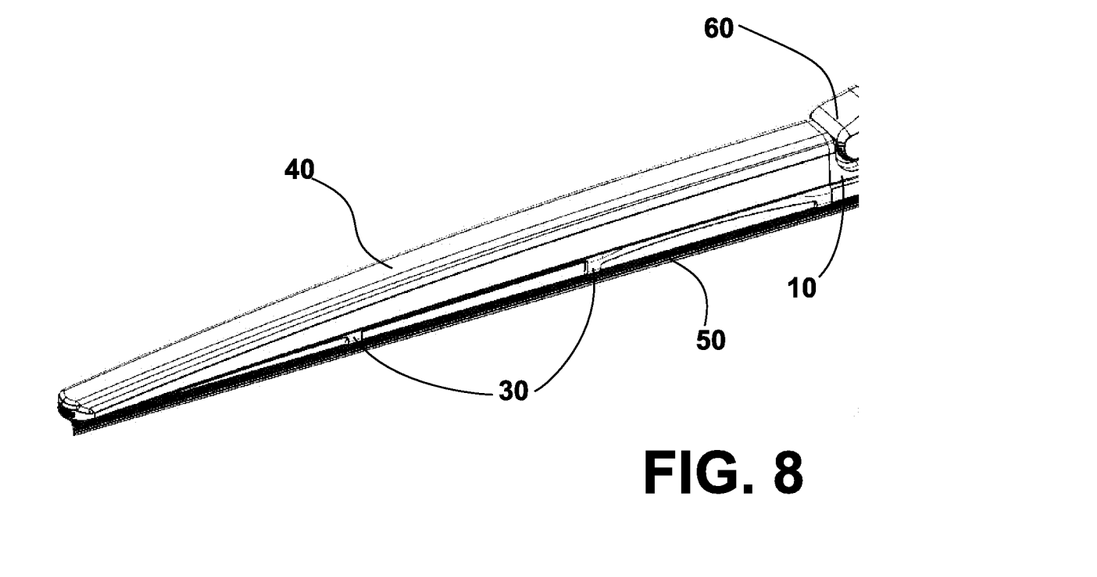
FIG. 8 is a perspective assembly view of a wiper blade cover overlaid upon interconnected embodiments of primary, secondary and tertiary frame structures.
Figure 10:
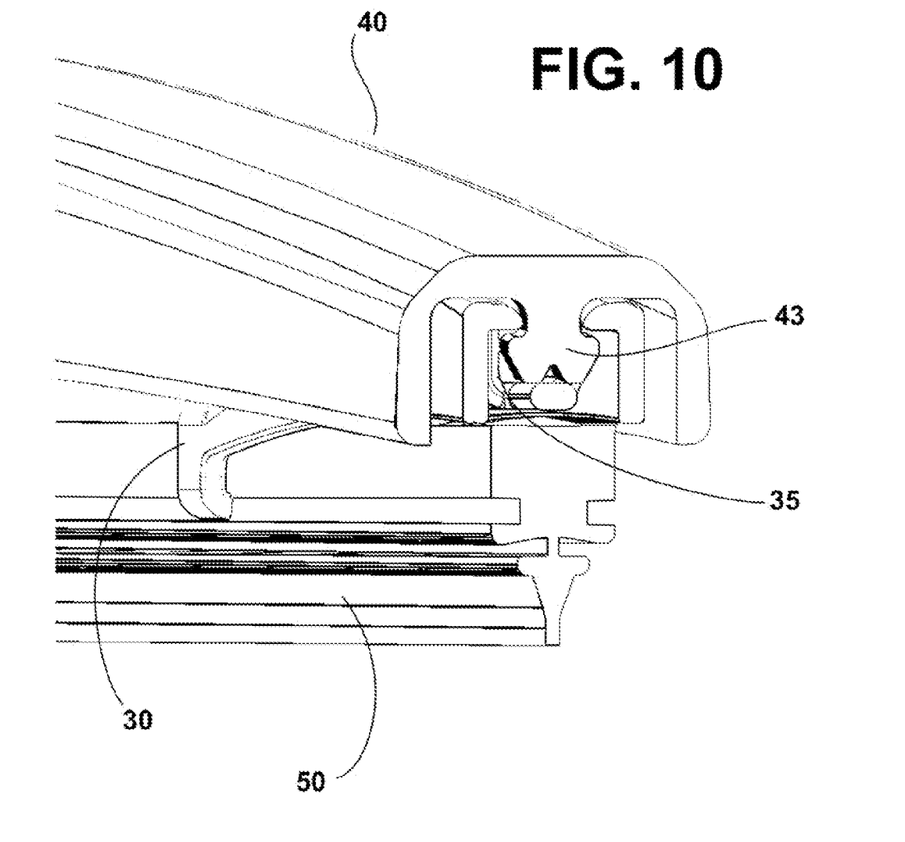
FIG. 10 is a perspective, longitudinal end view of a wiper blade showing a locking protrusion of the wiper blade cover engaged with the tertiary frame structure in accordance with the disclosed concepts.

FIG. 1 is a perspective view of an embodiment of the force distribution structure for a wiper blade assembly 1 in accordance with the disclosed concepts, which connects to and secures a wiper strip 50. The force distribution structure may include a primary frame structure 10 connected to two secondary frame structures 20. Each of the secondary frame structures 20 may be connected to two tertiary structure frame structures 30. As illustrated in FIGS. 8 and 10, the tertiary frame structures may connect to and secure a wiper strip 50.

Figure 2:
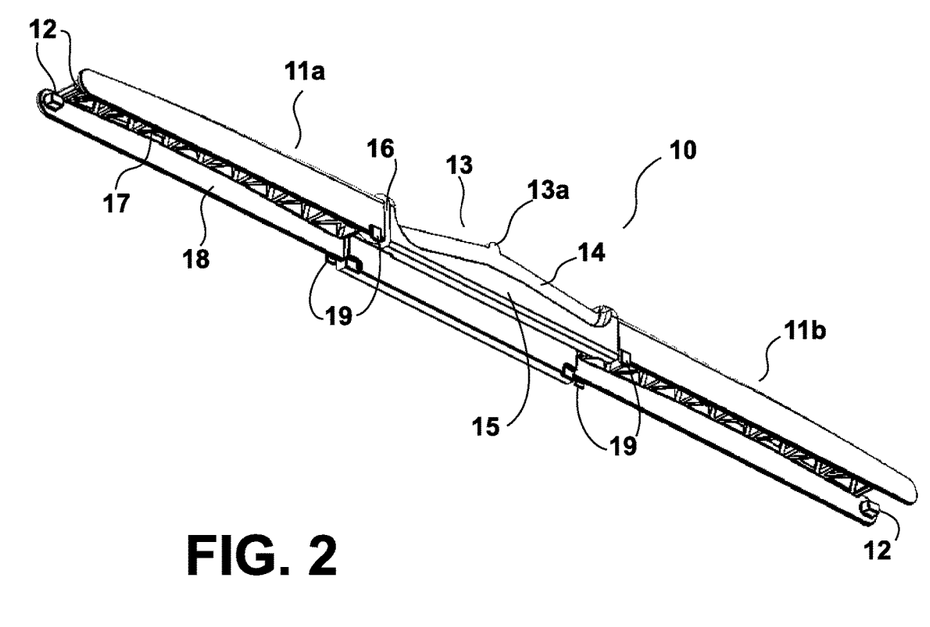
FIG. 2 is a perspective view of an embodiment of a primary frame structure in accordance with the disclosed concepts in accordance with the disclosed concepts.
Figure 11:
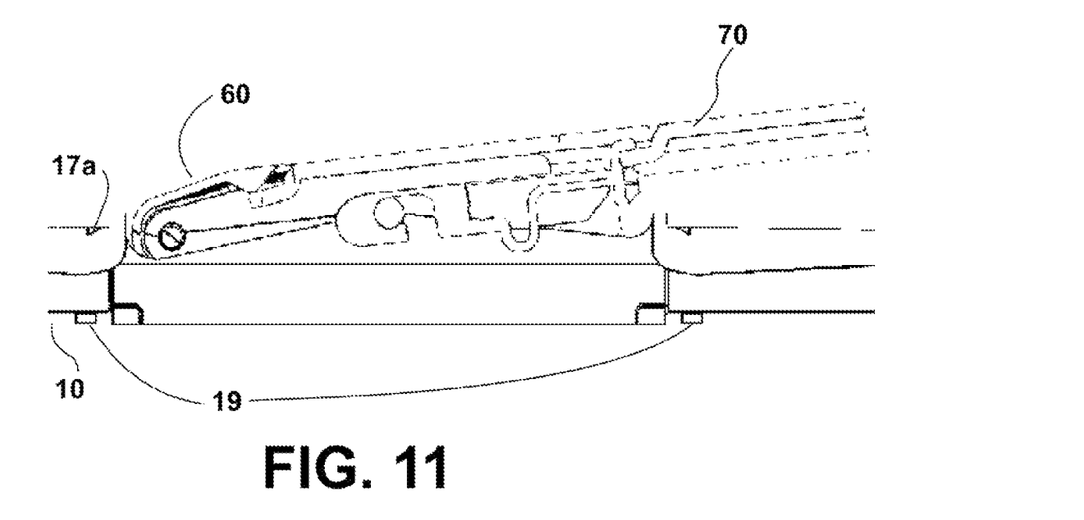
FIG. 11 is a side view of a cross section of the primary frame with a connector assembly attached in accordance with the disclosed concepts.

As illustrated in FIG. 2, the primary frame structure 10 may features a central base portion 13 and a first and second legs 11a, 11b extending therefrom. As shown in the figures, the legs 11a, 11b may be of the same or similar lengths, or alternatively they may have different lengths. The central base portion may have a connection device, such as rivet 13a that facilitates connecting to a wiper blade connector assembly 60, as shown in FIG. 11. The central base portion 13 may have an outer wall, and a first and second ends 16. The central base portion may further have a recessed wall 14, to facilitate a connection to the wiper blade connector assembly 60. The recessed portion may be provided with an obtuse angle on its bottom portion to facilitate the pivoting of the wiper blade connector assembly 60. The legs 11a, 11b of the primary frame structure 10 may extend from the ends 16 central base portion 13 to their own respective ends. The legs may be generally "U" shaped, having a top portion 17, and side walls 18. The side walls 18 of the legs 11a, 11b may be recessed relative to the side walls 15 of the central base portion 13. The primary frame structure may further include securing tabs 19 disposed proximate the bottom of the central base structure to engage securing recesses in a cover. As shown in FIG. 11, the primary frame structure may also include a notch 17a proximate the central base portion 13 on the top portion 17 to secure a tab 46 of a cover.

The primary frame structure 10 may connect to secondary frame structures 20 by a primary boss connecting structure proximate the ends of the legs 11a, 11b of the primary frame structure 10 that engages a primary complementary connecting structure disposed between the legs 21a, 21b of the secondary frame structures 20. As shown in the figures, the legs 21a, 21b may be of differing lengths, or alternatively they may have the same length. One of the primary boss connecting structure and the primary complementary connecting structure may be a boss structure and the other may be a pocket structure such that there is a pivotal engagement between the primary boss connecting structure and the primary complementary connecting structure. Persons of ordinary skill in the art will recognize that the pocket/boss relationship may be flipped between the primary and secondary frames within the scope of the disclosed concepts. In the exemplary embodiment, the primary boss connecting structure disposed on the ends of the legs 11a, 11b of the primary frame 10 is a boss structure, and more specifically is a pair of opposed bosses 12. The pair of opposing connecting bosses 12 may be disposed proximate to each respective end of legs 11a, 11b. The opposing bosses 12 may be cylindrical, or partially cylindrical in shape. For example, the opposing bosses shown in FIG. 1 are truncated cylinders, where the top and bottom circular segments of the circle of the cylinder have been removed, creating two equal, opposing flat edges on each boss 12.

Figure 3:
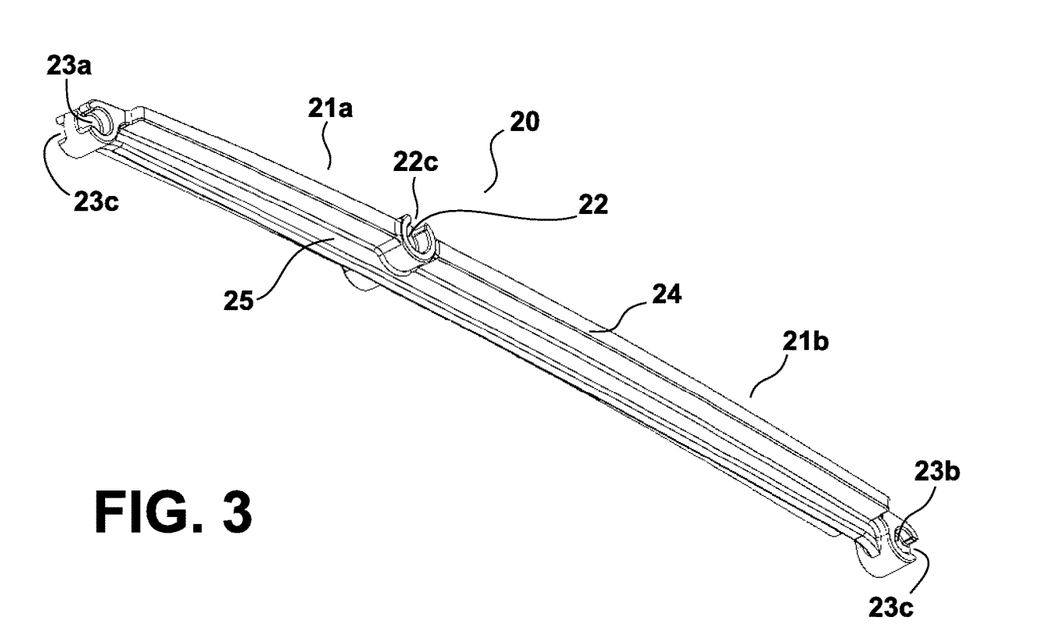
FIG. 3 is a perspective view of an embodiment of a secondary frame structure in accordance with the disclosed concepts in accordance with the disclosed concepts.

As shown in FIG. 3, the secondary frame structure 20 may include a primary complementary connecting structure. As described above this may be a boss structure or a pocket structure. In the exemplary embodiment, the primary complementary connecting structure is a pocket structure, and more specifically, it comprises two primary opposing pockets 22 located between the legs 21a, 21b of the secondary frame structure 20. As also shown in FIG. 3, the primary pockets 22 may be provided with a partial opening, or receiving channel 23c, that may be oriented vertically, such as upwards or downwards. The receiving channel 23c may facilitate the insertion of the opposed bosses, and the retention of same when the frames are rotated into operating position, as described below. Persons of skill in the art will recognize that in lieu of opposed pockets 22 an single open pocket, or other similar structure known in the art may be used to receive the opposed bosses 12, or a single rivet or boss. The legs 21a, 21b of the secondary frame structure 20 may extend from the primary opposing pockets 22 to their respective ends. The legs 21a, 21b of the secondary frame structure may be formed by a horizontal bar 24 and a vertical bar 25 such that the secondary frame structure 20 has a "T" shape.

Similarly, and as described above the secondary frame structure 20 may connect to tertiary frame structures 30 by having secondary boss connecting structures disposed on the respective ends of the legs 21a, 21b. Alternatively, the legs 21a, 21b of the secondary frame structure 20 may be provided with claws to connect to and secure the wiper strip 50. As with the primary connecting structures, the secondary boss connecting structure may be a pocket structure or a boss structure, and should complement the secondary complementary connecting structures of the tertiary frames. In the exemplary embodiment, the secondary boss connecting structures are a pocket structure, and more specifically, a pair of opposed pockets 23, 23a, 23b that open outwardly. The secondary pockets 23, 23a, 23b further include a receiving channel 23c that is oriented horizontally, or longitudinally. The receiving channel 23c may facilitate the insertion of the opposed bosses 33 of the tertiary frames.

Figure 4:
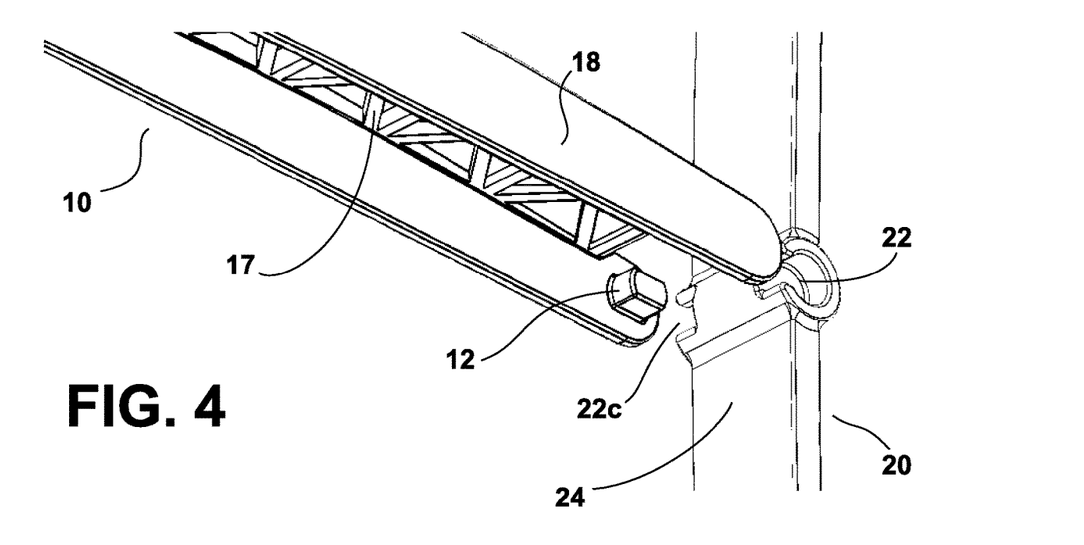
FIG. 4 is an exploded, perspective view of the alignment of a connecting boss of the primary frame structure in relation to a pocket on the secondary frame structure, as the structures are aligned to be engaged in accordance with the disclosed concepts.

FIG. 4 shows the alignment required to engage the connecting bosses 12 of the primary frame structure with the primary pocket 22 of the secondary frame structure. The primary frame structure is aligned perpendicular to the secondary frame structure, aligning the flat edges of the connecting bosses with the receiving channel 22c of the primary pockets 22. The connecting bosses 12 may then be guided into the pockets 22 until the circular portion of the connecting bosses and the cylindrical pocket are concentric. By rotating one of the frame structures relative to the other so that the primary and secondary frame structures are parallel or nearly parallel, and such that the bosses are oriented perpendicular to the direction of insertion into the receiving channel, the connecting boss is secured within the pocket.

Figure 5:
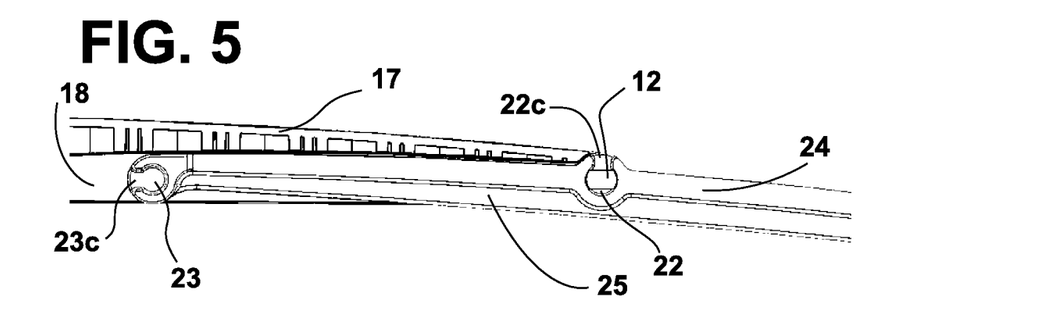
FIG. 5 is a side, cross-sectional view of the connecting boss of the primary frame structure engaged in a locked position with the pocket of the secondary frame structure in accordance with the disclosed concepts.

The bosses are preferably sized such that they can enter when properly oriented and aligned to the receiving channel, but that they are retained when oriented perpendicular to same. As shown in FIG. 5 the connecting boss 12 in a locked position within the primary pocket 22 of the secondary frame structure 20. Due to the diameter of the connecting boss 12 being greater than the size of the opening 22c, the connecting boss 12 cannot disengage the pocket until it is once again aligned with the partial opening of the pocket 22. It should be understood and appreciated that the orientation of central pocket may be angled and not necessarily perpendicular with respect to an axis between the longitudinal ends of the secondary frame structure. For instance, while central pocket is illustrated approximately perpendicular, in other embodiments the central pocket may angled up to about forty five degrees in either direction, consequentially requiring connecting boss to be inserted at an angled orientation rather than a perpendicular or nearly perpendicular orientation as shown in FIG. 4. This angled orientation of central pocket may permit different combination of pivot angles with respect to wiper blades utilized to clean unorthodox surfaces.

Figure 6:
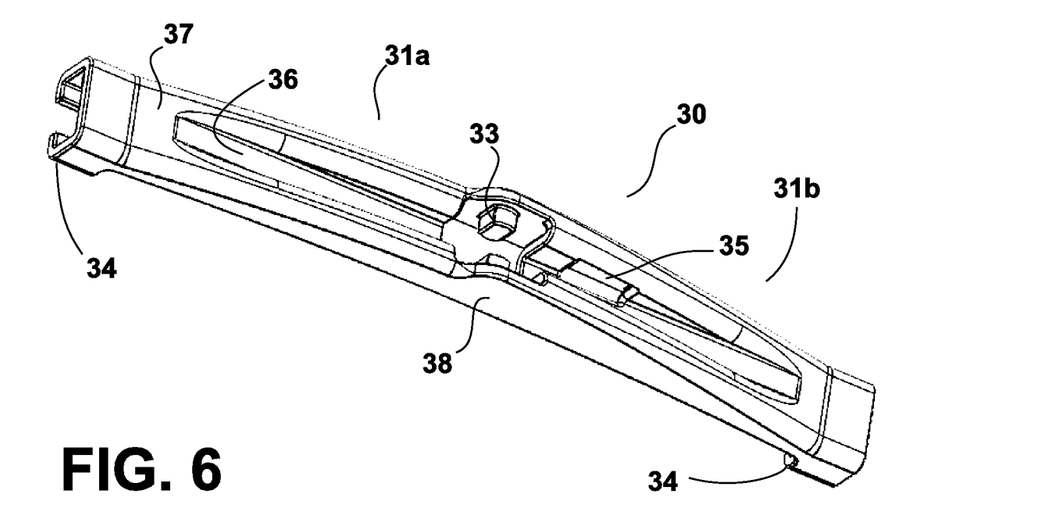
FIG. 6, is a perspective view of an embodiment of a tertiary frame structure in accordance with the disclosed concepts.

FIG. 6 shows a perspective view of an embodiment of the tertiary frame structure 30. As shown, secondary complementary connecting structures are a boss structure, and more specifically, a pair of opposed connecting bosses 33. The legs 31a, 31b of the tertiary frame structure 30 extend from the secondary complementary connecting structure to their respective ends. The legs may have a top surface 37 and side walls 38. A recessed channel 36 may be disposed in the top surface 37. A pair of claws 34 may be disposed on the ends of the legs 31a, 31b to connect with and secure the wiper strip 50. Also shown are the interior recesses 35 proximate the connecting bosses which may receive and secure a locking projection 43 from the cover 40.

Figure 7:
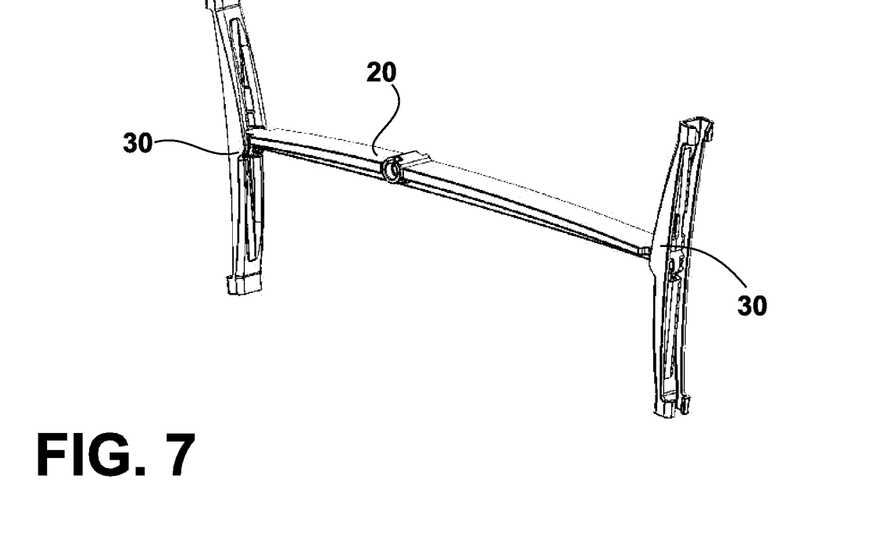
FIG. 7 is a perspective view of the secondary frame structure engaged with two tertiary frame structures in accordance with the disclosed concepts.

FIG. 7 is a perspective view of the secondary frame structure 20 engaged with two tertiary frame structures 30 at each longitudinal end of the legs 21a, 21b of the secondary frame structure 20. As with the connection between the primary frame structure 10 and the secondary frame structure 20 The tertiary frame structures may be engaged by aligning the flat ends of the connecting bosses 33 with the partial openings of the longitudinal pockets 23a, 23b of the secondary frame structure 20, in the same manner in which the primary frame structure 10 is engaged with the secondary frame structure 20. The connecting bosses 33 may then be guided through the receiving channels 23c into the pockets 23a, 23b until the circular portion of the connecting bosses 33 and the cylindrical pocket are concentric. By rotating one of the elements so that the tertiary and secondary frame structures are parallel or nearly parallel, the connecting boss is secured within the pocket. As similarly discussed with respect to FIG. 5, the partial openings 23c of the secondary frame structure by angled alternatively from the orientation illustrated, thereby permitting further combination of pivot angles between secondary frame structure and one or more attached tertiary frame structures.

The wiper blade assembly 1 may further include a cover comprising cover sections 40 in accordance with the disclosed concepts. FIG. illustrates 8 is a perspective view of an embodiment of a wiper blade showing a wiper blade cover section 40 attached to the primary, secondary and tertiary frame structures. As shown, the wiper blade cover section 40 covers, protects and obscures most of the internal interconnected structural elements. In some embodiments, the wiper blade cover may be a two-piece soft cover design. The wiper blade cover section 40 may have an inner side, an end, a top portion 47, and a pair of opposed side walls 48. When attached to the force distribution structure, the inner end of the wiper blade cover section 40 may be proximate to the central base portion of the primary frame structure 10. The ends of the wiper blade cover section may be flush with or proximate to the ends of the outer tertiary frame structures 30.

Figure 9:
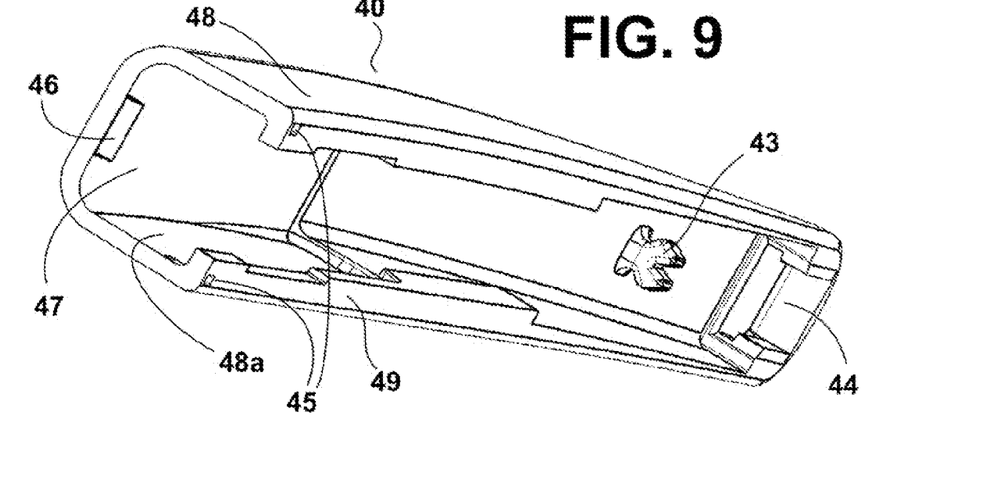
FIG. 9 is a bottom perspective view of a wiper blade cover in accordance with the disclosed concepts.

FIG. 9 shows a bottom perspective view of an embodiment of the wiper blade cover section 40. As shown, the wiper blade cover may feature a retention tab 46 on the top inner end of the wiper blade cover to engage with the top notch 17a of the primary frame structure 10. The cover section 40 may further have securing recesses 45 on the bottom, back end for engaging with the securing tabs 19 of the primary frame structure 10. The cover section 40 may also have a lip 49 on the bottom of the cover section 40 to partially wrap around the primary frame structure 10. The wiper blade cover section may further have an internal recessed side wall section 48a to facilitate connecting and securing legs of the primary frame. The wiper blade cover may also feature a locking protrusion 43 extending downward from the top portion 47 of the cover section 40. The cover section 40 may further have an end recess 44 to receive and house the end of the force distribution structure, including the end of the outer tertiary frame structure 30.

FIG. 10 illustrates a cross-sectional view of the locking protrusion 43 of the wiper blade cover engaged in the interior recesses 35 of a tertiary frame structure 30. The locking protrusion 43 may be made of a resilient material to allow for compression during insertion into the interior recesses and its return to its original shape once inside the interior recesses 35, partially securing the wiper blade cover to the tertiary frame structure 30.

FIG. 11 illustrates a cross sectional view of the embodiment of the wiper blade assembly 1 connected to a connector assembly 60. Notches 17a on the top portion 17 of the primary frame structure 10 can be disposed proximate to the central base portion 13. An exemplary connecting structure 60 is shown whereby a connector and connector cover secure the wiper blade to wiper arm 70. The disclosed concepts may be practiced with any connector assembly system known in the art, including any connection devices, connectors, and adapters known in the art or to be discovered, including but not limited to the connector assembly and system described in the concurrently filed U.S. patent application Ser. No. 16/049,450, the entire contents of which is hereby incorporated herein by reference in its entirety.

We claim:

1. A windshield wiper assembly comprising:
   a wiper strip;
   a force distribution structure securing the wiper strip comprising:
   a primary frame structure comprising a central base portion, a leg extending from the central base portion to a distal end of the primary frame structure, and a first boss connecting structure provided at the distal end of the primary frame structure;
   a secondary frame structure comprising a secondary central base portion, a secondary leg extending from the secondary central base portion to a distal end of the secondary frame structure, and a first complementary connecting structure provided on the central base portion, such that the first boss connecting structure and the first complementary connecting structure pivotally engage one another,
   wherein the first boss connecting structure includes a pair of side walls projecting as cantilevers towards the distal end of the primary frame structure, and a pair of opposed bosses projecting inwardly from a cantilever portion of the side walls, and
   wherein the first complementary connecting structure includes a pair of central pockets open outwardly, and the pair of opposed bosses are engageable with the pair of pockets.

2. The windshield wiper assembly of claim 1 wherein the opposed bosses are truncated cylinders.

3. The windshield wiper assembly of claim 1 wherein the opposed bosses are oriented horizontally.

4. The windshield wiper assembly of claim 1 wherein each pocket is provided with a receiving channel to facilitate insertion of the boss structure into the pocket structure.

5. The windshield wiper assembly of claim 1 wherein the secondary frame structure is "T" shaped.

6. The windshield wiper assembly of claim 1 wherein the force distribution structure further comprises a tertiary frame structure comprising a second complementary connecting structure, wherein the secondary frame structure further comprises a second boss connecting structure.

7. The windshield wiper assembly of claim 6 wherein the second complementary connecting structure is a second pair of opposed bosses extending inwardly, and the second boss connecting structure comprises a pair of pockets that open outwardly.

8. The windshield wiper assembly of claim 7 wherein the second pair of opposed bosses are truncated cylinders that are oriented vertically.

9. The windshield wiper assembly of claim 1 further comprising
 a cover section comprising a pair of cover section side walls, a top portion provided between the pair of cover section side walls, an inner end and an outer end.

10. The windshield wiper assembly of claim 8 wherein the cover section further comprises a retention tab proximate the inner end, and the primary frame further comprises a notch proximate the central base portion, such that the retention tab can engage the notch to secure the cover to the primary frame structure.

11. The windshield wiper assembly of claim 8 wherein the cover section further comprises a lip proximate the inner end, such that the lip can wrap around the bottom of the primary frame structure to further secure the cover to the primary frame structure.

12. The windshield wiper assembly of claim 8 wherein the cover section further comprises securing holes proximate the central base portion, and the primary frame structure further comprises securing tabs that engage the securing holes in the cover section.

13. The windshield wiper assembly of claim 8, wherein the cover section further comprises a locking protrusion extending downward from the top portion, that engages an interior recess of the force distribution structure to help secure the cover to the force distribution structure.

14. The windshield wiper assembly of claim 8, wherein the cover section further comprises an end recess capable of receiving the end of the force distribution structure.

15. A windshield wiper assembly comprising:
 a wiper strip;
 a force distribution structure securing the wiper strip, the force distribution structure comprising:
  a primary frame structure comprising a central base portion, a leg extending from central base portion to a distal end of the primary frame structure, and a primary boss connecting structure provided at the distal end of the primary frame structure;
  a secondary frame structure comprising a secondary central base portion, a secondary leg extending from the secondary central base portion to a distal end of the secondary frame structure, a primary complementary connecting structure provided at the secondary central base portion, and a tertiary complementary connecting structure provided at the distal end of the secondary frame structure; and
  a tertiary frame comprising a tertiary central base portion, a second boss connecting structure, a tertiary leg extending from the tertiary central base portion to a distal end of the tertiary frame, and a claw provided at the distal end of the tertiary frame structure that engages the wiper strip,
 wherein the first boss connecting structure includes a pair of primary frame sidewalls and a pair of opposed primary bosses projecting inwardly from the primary frame sidewalls, the primary complementary connecting structure includes a pair of central pockets open outwardly, and the first boss connecting structure and the primary complementary connecting structure pivotally engage one another as the pair of opposed primary bosses engage with the pair of central pockets, and
 wherein the second boss connecting structure includes a pair of tertiary frame sidewalls and a pair of opposed tertiary bosses projecting inwardly from the tertiary frame side walls, the tertiary complementary connecting structure includes a pair of distal pockets open outwardly, and the secondary boss connecting structure pivotally engages the tertiary complementary connecting structure as the opposed tertiary bosses engage with the pair of distal pockets.

16. The windshield wiper assembly of claim 15 wherein the pair of primary side walls project as cantilevers towards the distal end of the primary frame structure, and the pair of opposed primary bosses are provided at a cantilever portion of the primary side walls.

17. The windshield wiper assembly of claim 15 wherein the opposed tertiary bosses are provided in a recessed channel in a top tertiary surface of the tertiary frame.

18. The windshield wiper assembly of claim 15 wherein the first bosses are oriented horizontally on the primary frame side walls and the second bosses are oriented vertically on the tertiary frame side walls.

19. The windshield wiper assembly of claim 15 wherein the pair of primary side walls project as cantilevers towards the distal end of the primary frame structure,
 wherein the opposed tertiary bosses are provided in a recessed channel in a top tertiary surface of the tertiary frame, and
 wherein the first bosses are oriented horizontally on the primary frame side walls and the second bosses are oriented vertically on the tertiary frame side walls.

* * * * *